Feb. 8, 1966

C. P. DE BIASI  3,233,691

HYDRAULIC SYSTEM, APPARATUS AND ARRANGEMENT FOR
DRIVING AND STEERING VEHICLES

Filed Oct. 17, 1962  2 Sheets-Sheet 1

INVENTOR
Charles P. de Biasi
ATTORNEY

Feb. 8, 1966 C. P. DE BIASI 3,233,691
HYDRAULIC SYSTEM, APPARATUS AND ARRANGEMENT FOR
DRIVING AND STEERING VEHICLES
Filed Oct. 17, 1962 2 Sheets-Sheet 2
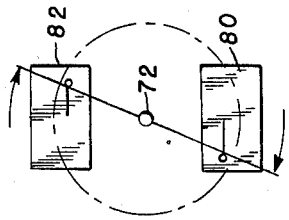
FIG. 6
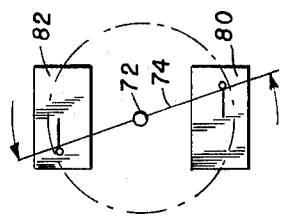
FIG. 5
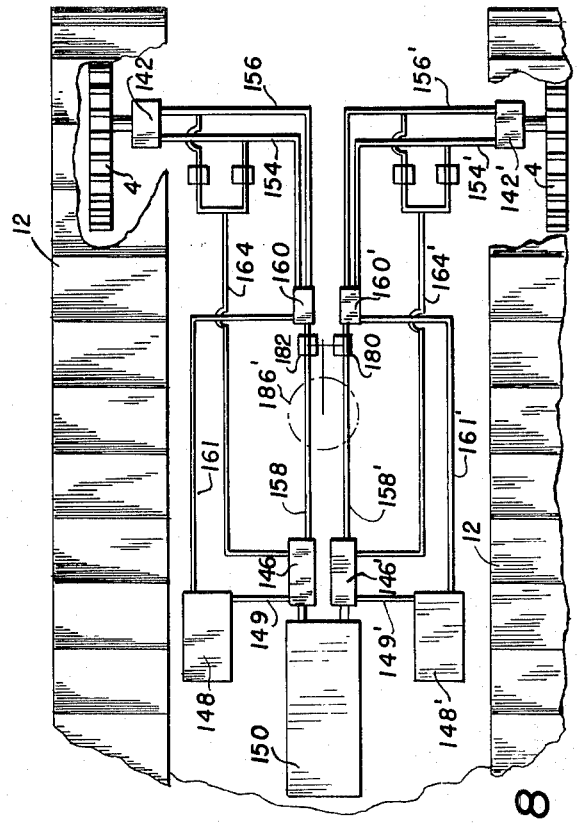
FIG. 8
FIG. 4
FIG. 3
FIG. 7
INVENTOR
Charles P. de Biasi
ATTORNEY

United States Patent Office 3,233,691
Patented Feb. 8, 1966

3,233,691
HYDRAULIC SYSTEM, APPARATUS AND ARRANGEMENT FOR DRIVING AND STEERING VEHICLES
Charles P. de Biasi, 74 Braman Road, Waterford, Conn.
Filed Oct. 17, 1962, Ser. No. 231,192
9 Claims. (Cl. 180—6.48)

The present invention relates generally to land operated vehicles, and is more particularly concerned with a novel system and apparatus employing hydraulic means and arrangements for driving and steering such vehicles as well as powering hydraulically operable units, attachments, devices or equipment which may be associated therewith.

The conventional drive system employed in most of the present forms of self-propelled, land operated vehicles typically includes a power source such as a motor or engine coupled through a clutch device, transmission, drive shaft and differential to the drive wheels on each side of the vehicle. The motor or engine is usually a reciprocating piston type gasoline or disel unit having low torque characteristics at slow speeds, thereby necessitating the elaborate transmission mechanism and clutching device to permit starting the vehicle and subsequently developing speed.

The customary steering arrangement for wheeled vehicles requires turning one set of wheels causing the outside wheels of the vehicle to describe an arc larger in radius than the wheels on the inside. Consequently, since the outside wheels must travel farther than the inside wheels, a differential must be provided to allow the outside wheels to turn more rapidly. In other words, the differential normally merely unlocks one of the drive wheels from the drive mechanism while the other drive wheel powers the vehicle around the turn. In a track or crawler type vehicle, the steering is usually accomplished by clutching and braking one of the track drive sprocket wheels while the other track pulls the vehicle through the desired turn. In either case, it may be seen that, during the turn, the tractive effort is exerted only by one of the drive wheels or sprockets.

Accordingly, a primary object of the present invention is to provide a novel hydraulic system, apparatus and arrangement for driving and steering vehicles which overcomes the above disadvantages and also greatly simplifies both the driving and steering methods as well as the control thereof for such vehicles.

It is also an object of this invention to provide a novel hydraulic system and apparatus for driving and steering vehicles which is also effective for powering any hydraulically operable unit, attachment, apparatus, equipment, device or the like, which may be employed or associated with the vehicle.

A further object of the invention is to provide an improved hydraulic system and apparatus for driving and steering a vehicle in which the source of pressure fluid discharge is varied in response to the demand placed thereon by the hydraulically operable driving and steering arrangements as well as the demand of any other hydraulically operable unit, attachment, apparatus, device, equipment, or the like, which may be employed on or associated with the vehicle.

Another object of the invention is to provide a hydraulic system, apparatus and method for driving and steering vehicles which has high torque characteristics at slow speeds and which is further characterized by providing continuously balanced tractive effort for the drive arrangement of the vehicle.

It is also a further object of this invention to provide an improved hydraulic system and apparatus for driving and steering vehicles as well as powering any and all hydraulically operable units, arrangements, attachments, devices or equipment that may be associated therewith which is inexpensive to manufacture and install; convenient, economical and trouble-free in use and operation; reliable, durable and effective for the purpose intended; and which is more flexible and usable than any other similar system, apparatus and method heretofore known.

Other objects, advantages and important features of the invention will be apparent from a study of the specification following, taken with the drawing, which together describe, disclose, illustrate and show certain embodiments, modifications, procedures and alternatives of the invention and what is now considered and believed to be the best method of practicing the principles thereof. Still other embodiments, modifications, procedures or equivalents may be subject to those having the benefit of the teaching herein and such other embodiments, modifications, procedures or equivalents are intended to be reserved especially if they fall within the scope and breadth of the subjoined claims.

In the drawing:

FIGURE 3 is a schematic front elevational view of a steering control linkage for the vehicle illustrated in FIGURES 1 and 2;

FIGURE 4 is a schematic side elevational view of the linkage shown in FIGURE 3;

FIGURES 5 and 6 are schematic plan views of the linkage shown in FIGURE 3 respectively illustrating left and right positions thereof;

FIGURE 7 is a partial horizontal sectional view of an automatic pressure responsive fluid flow regulator means employed in the hydraulic system, apparatus, arrangement and method shown in FIGURE 1, and FIGURE 8 is a schematic plan view similar to FIGURE 1 illustrating a modified hydraulic system, apparatus, arrangement and method for driving and steering vehicles.

Figures 1, 2:
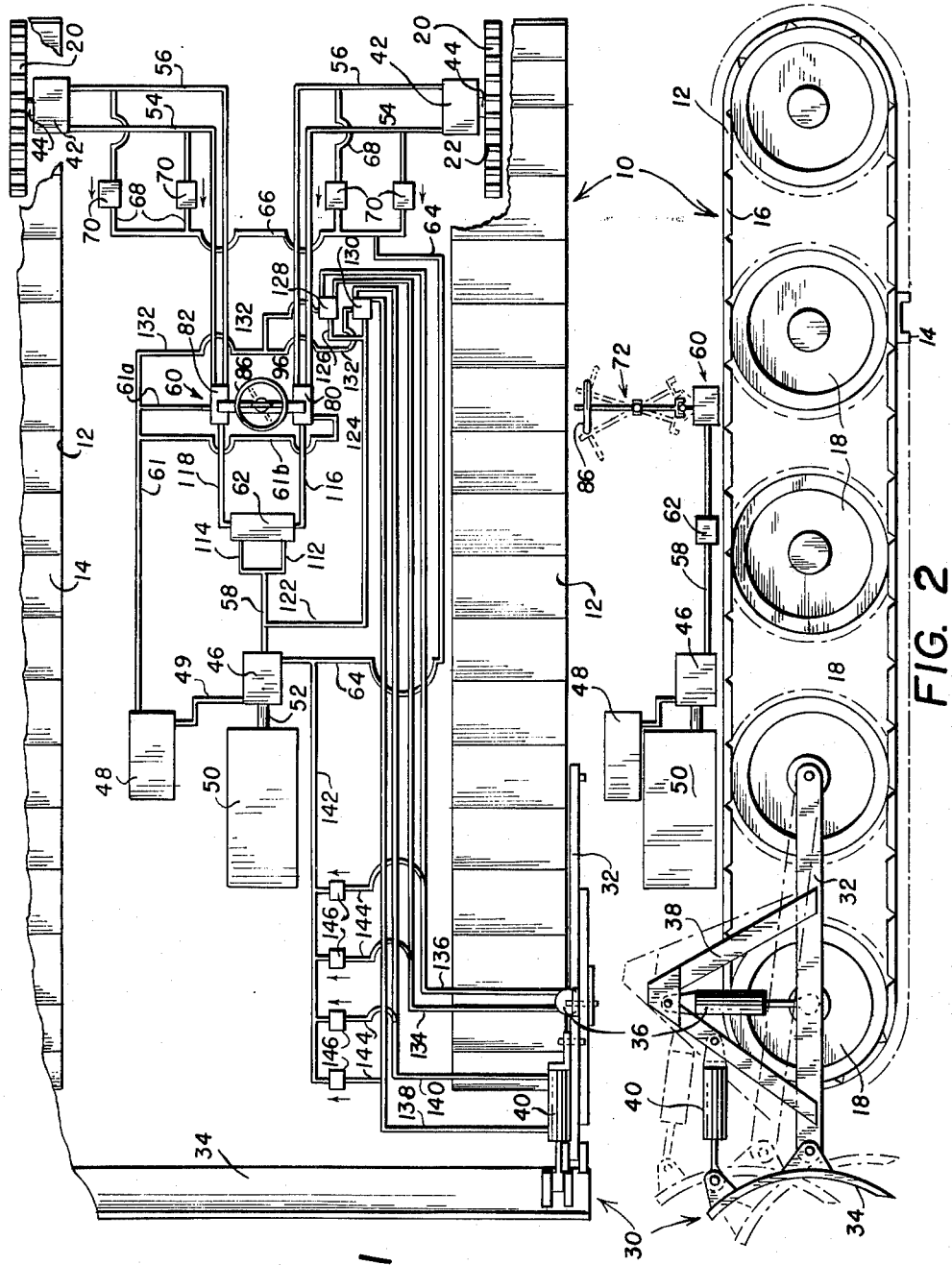
FIGURE 1 is a schematic plan view of an illustrative track or crawler type vehicle having a plurality of hydraulically operable units, attachments, devices or equipment and incorporating the features of a hydraulic system, apparatus, arrangement and method of the present invention.
FIGURE 2 is a schematic side elevational view of the vehicle shown in FIGURE 1.

Referring now to the drawing, there is shown in FIGURE 1 a vehicle 10 provided with an improved hydraulic system and employing a method which comprises apparatus and arrangements for controlling, steering and driving the vehicle 10 as well as powering any other hydraulically operable units, attachments, devices, equipment, or the like, which may be employed on or associated therewith.

Reference may be had to my United States Letters Patent No. Reissue 25,702 which in a reissue of my United States Letters Patent 3,003,262 wherein there is described, disclosed, illustrated, shown and claimed a vehicle having a hydraulic system and apparatus for controlling and driving the vehicle as well as powering units, attachments, etc., of the accessory type and it is to be understood that the instant inventive concept is to be considered as an improvement over the hydraulic systems, apparatus and arrangements which are the inventive concepts of my above-identified patents.

By way of example, and for the purpose of illustration only, the vehicle 10 is herein shown and illustrated in the drawing and described in the descriptive portion of the specification as a track or crawler type vehicle which is provided with a plurality of hydraulically operable apparatus or arrangements for driving and steering the vehicle 10, and a plurality of hydraulically operable units, attachments, devices or equipment, such as a bulldozer having a tiltable blade, with the hydraulic system, method, apparatus and arrangements being manually controlled by an operator of the vehicle 10.

It is to be understood that many other vehicles, including wheel type vehicles, and other types of hydraulically operable units, attachments, devices or equipment may be employed other than as illustrated, described, disclosed and shown herein without departing from the spirit of the present invention.

In the illustrative embodiment, as shown in FIGURE 1, of the drawing, the track or crawler type vehicle 10 comprises an endless track or tread 12 disposed on each side thereof for driving and supporting the vehicle 10 during the operation thereof. Each of the endless tracks or treads 12 may have a plurality of generally transversely extending ridges or traction cleats 14 on the outer surface thereof or may be smooth as shown and comprises a generally longitudinally extending series of cog-like members 16 which is entrained over a plurality of idler-like support wheels or sprockets 18 and a drive wheel or sprocket 20. The drive sprocket 20 of each track or tread 12 has a tooth-like periphery 22 for engaging the respective cog-like web or belt 16 to impart driving movement to the track or tread 12.

A bulldozing attachment 30 is pivotally mounted for vertical movement adjacent the forward end portion of the vehicle 10 by means 32 in the form of a pair of side arms pivotally supported adjacent opposed end portions of an axle of one of the idler or support sprockets 18, with the arms 32 tiltably supporting a blade 34 thereon. A hydraulically operable unit, device or equipment 36, which may be in the form of an extensible-retractable elevating and lowering ram, is pivotally supported at one end portion on an axle of the foremost idler or support sprocket 18 of the vehicle 10 for raising and lowering the forward end portions of the arms 32 by means 38 in the form of inverted V-supported frame structures secured to each of the arms 32, with the hydraulic ram 36 being connected at the upper or opposite end portion thereof to the upper apex of the frame structure 38. A second hydraulically operable unit, device or equipment 40 in the form of an extensible-retractable tilt ram is interposed between a top portion of the blade 34 and a forward portion of the support frame structure 38 for adjusting the angle of attack of the tiltable blade 34 of the bulldozer attachment 30.

In accordance with the present invention, a novel hydraulic system, apparatus, arrangement and method is provided for driving and steering the vehicle 10. In the preferred embodiment or modification, as illustrated in FIGURE 1 of the drawing, the system comprises a hydraulic driving arrangement 42 in the form of individual reversible or bi-directional fixed displacement hydraulic responsive means which preferably is a pair of motors each of which is coupled by a drive shaft 44 to the drive wheel or sprocket 20 of the respective track or crawler 12 on either side of the vehicle 10, and by suitable conduit means to a source of hydraulic pressure in the form of a normal minimum flow variable displacement hydraulic pump device 46 carried on the vehicle 10 for supplying hydraulic pressure fluid to the hydraulic responsive means or motors of the driving arrangement 42. A source or reservoir 48 of hydraulic pressure fluid is in communication with the input or intake side of the pump device 46 by means of conduit means 49.

For driving the vehicle 10, and powering the units, attachments, devices, equipment, or the like, which may be associated therewith, a power source 50 is coupled to the pump device 46 by a shaft 52. Preferably, the power source 50 is a motor or an internal combustion engine of the regenerative gas turbine type. Such a gas turbine is desirable because the torque output thereof is maximum at what might be called idling speed and the horsepower increases with an increase in the r.p.m. The engine, together with the novel hydraulic system, apparatus, arrangement and method as hereinafter described, produces the optimum in vehicle propulsion because the drive wheels or sprockets 20 are provided with maximum torque not only through all speeds, but most important, at very slow speeds of the power source 50 without the use of conventional mechanism, such as transmissions, clutches, drive shafts and differentials. Nevertheless, it is also to be appreciated that even with ordinary or conventional type piston engines, when operated in connection with the present invention, will produce many improvements over normal or usual driving arrangements.

The hydraulic system, apparatus, arrangement and method employed in the present invention also comprises conduit system such as fluid-flow reversible supply and return conduit means 54 and 56 communicating with each of the bi-directional driving hydraulic motor means or arrangements 42 and pressure fluid supply conduit means 58 thereto from the pump 46. The conduit system also includes manually operable valving 60 and automatic pressure responsive fluid flow regulator means 62 shown in FIGURE 7 communicating the fluid discharge of the pump device 46 with the hydraulic driving arrangements 42. In addition, for substantially statically transmitting the pressure of the fluid obtaining downstream of valving 60 in the motor means pressure fluid supply conduits back to the displacement control of the pump device 46, a conduit means 64 interconnects the said displacement control mechanism of the pump device 46 with both of the flow reversible pressure fluid supply and return flow conduit means 54, 56 at a location intermediate the valving 60 and the motor means 42 through a common header conduit 66 and a plurality of branch conduits or lines 68 each having one-way flow check valving means, such as check valves 70 therein. The check valving means 70, associated with each of the branch lines 68 and the reversible flow pressure supply and return lines 54, 56, permits the flow of fluid therein only in the direction away from the hydraulic driving arrangements or motors 42.

To control the fore and aft direction of movement and for steering the vehicle 10, the valving 60, which may be in the form of a manually operated dual-chambered double four-way variable orifice, spring-centered open type valve, selectively regulates the direction and amount of pressure fluid discharge from the pump device or means 46 to one of the flow reversible pressure fluid supply and return means 54, 56 of each of the hydraulic motor or driving arrangements 42. The double four-way valving 60 also has return conduit means 61 for selectively communicating either of the flow reversible fluid supply and return conduit means 54 or 56 of each of the hydraulic driving arrangements 42 with the reservoir or source 48 of fluid in communication with the pump device 42. The actuating means for controlling the variable orifice valving 60 to regulate the direction of and the amount of pressure fluid to each to the bi-directional driving arrangements 42 includes an aircraft joy-stick type of steering column 72 with a control bar 74 at its lower end coupled to valve operators 76 and 78 which control the valving in each of the chambers or portions 80 and 82 of the double four-way valve 60. As shown in FIGURES 3 and 4, the steering column 72 comprises a tubular sleeve 84 carrying a steering wheel 86 at its upper end. The sleeve 84 is journalled for rotation about its vertical axis in a collar piece 88 which is supported for horizontal pivoting movement by a pair of stub shafts 90 journalled in spaced bearing blocks 92. Inserted within the tubular sleeve 84 and freely rotatable therein is a control rod 94 having a control handle 96 at its upper end within the convenient grasp of the vehicle operator. Thus by grasping the control handle 96, the operator can rock the steering handle fore and aft which will, in turn, urge the valve operators 76, 78 in opposite directions (see FIGURE 2). Similarly, by rotating the steering wheel 86, sleeve 84 and control bar 74, one of the valve operators 76 is urged in one direction and the other valve operator 78 is urged in the other direction (see FIGURES 5 and 6). Desirably, the valve operators 76, 78 are spring biased towards their center or neutral position. Thus, when the operator is neither rocking the steering column 72, nor rotating the steering wheel 86, the valve operators 76, 78 are returned to their neutral position and pressure fluid flowing into the valve chambers 80 and 82 at this time flows freely therefrom to reservoir 48 by means of conduits 61a and 61b connecting with return conduit means 61.

As previously indicated, the variable discharge hydraulic pump device 46 includes displacement control structure for varying the fluid pressure discharge of the pump 46 in response to the fluid pressure obtaining downstream of valving 60 transmitted thereto through the pressure transmitting pump control conduit means 64. In this way the displacement control mechanism for varying the fluid pressure discharge of the pump 46 is varied in response to the demand of the hydraulic driving arrangements 42. For the purposes of illustration, the pump device 46 may be a Sundstrand Hydraulic Division 32 PV series, normal minimum flow variable displacement pump, with integral fixed orifice control structure as described on page 7, Form #501, of the Sundstrand Hydraulic Equipment Catalog entitled "Sundstrand Variable Speed Drives" published by Sundstrand Hydraulic Division, 2210 Harrison Avenue, Rockford, Illinois, June 16, 1958 and shown schematically on page 36, Form #5308 of the Sundstrand Hydraulic Equipment Catalog entitled "Constant Speed Truck Refrigeration Drive" published by Sundstrand Hydraulic Division, 2210 Harrison Avenue, Rockford, Illinois, March 1958. The integral control structure measures the pump output or motor demand and compensates itself by varying the pump wobbler angle in response to the pressure in the control conduit 64. Thus, high fluid pressure for starting under load conditions involving relatively high torque requirements may be provided to the hydraulic driving motor arrangements 42 even though the engine 50 is running very slowly. Conversely, when the engine speed is increased to thereby drive the vehicle more rapidly, the adjustment of the displacement control structure of the variable discharge pump device changes in accordance with the pressure demand in the hydraulic driving arrangements 42 to achieve a pre-determined speed.

Pursuant to another feature of the invention, means are provided to balance or regulate the hydraulic pressure fluid discharge to each of the hydraulic driving arrangements 42 in response to their individual demands so as to maintain uniform tractive effort for each of the driving wheels 20. To this end, the pressure fluid automatic flow regulator or metering means, in the form of a dual chambered, single reciprocating valve 62 is placed in the pressure fluid supply conduit 58 to the driving arrangements 42. As shown in FIGURE 7, the valve 62 includes a single reciprocating piston 98 which carried a pair of valve members 100 and 102 on opposite sides thereof which are adapted to seat in a pair of discharge ports 104 and 106 in chambers 108 and 110, respectively. The pressure fluid supply conduit 58 is divided with two branches 112 and 114 supplying pressure fluid to each of the chambers 108, 110. Similarly, delivery lines 116 and 118, respectively, communicate the pressure fluid discharge from the chambers 108, 110 of the pressure fluid metering means 62 to the chambers or valve portions 80, 82 of the control valving 60. A pair of compression springs 120 and 122 serve to center the piston 98 between the chambers 108 and 110 under normal driving conditions.

The propulsion and steering of the vehicle 10 by means of the novel hydraulic system, arrangement and method of the present invention may now be summarized as follows. Assuming the vehicle 10 is at rest with the engine 50 not operating, the operator merely allows the control column 72 and steering wheel 86 to assume their centralized spring biased neutral position, and the engine 50 is started. With the engine running at idling speed, a normal minimum flow of pressure fluid is drawn into the intake of the pump device 46 from the reservoir 48 through the supply line 49 and is discharged from the pump through the pressure supply conduit 58, branch lines 112, 114 chambers 108, 110 of pressure metering valve 62, delivery lines 116, 118 to the control chambers 80, 82 of the manually controlled valving 60. Since the valve operators 76, 78 of the latter are both initially spring-centered in neutral position, the relatively small flow of the pressure fluid freely flows through valving 60 and is returned to the reservoir 48 through the return conduit means 61a, 61b and 61.

To drive the vehicle 10 in a forward direction the operator pushes the control handle 96 forward which in turn moves both of the valve operators 76, 78 simultaneously to their rear position which causes the normal relatively small flow of pressure fluid to flow from the chambers 80, 82 of control valving 60 through the flow reversible supply lines 54 to the hydraulic driving arrangements 42 thereby driving both of the drive sprockets 20 and tracks 12 forward. The pressure fluid is returned from the hydraulic driving arrangements 42 through the other flow reversible return line 56 to the respective chambers 80, 82 of the control valving 60 where it is communicated by the return conduits 61a, 61b and 61 to the reservoir 48. In addition, the delivery of pressure fluid from pump 46 at a given pressure through the flow reversible pressure supply lines 54 and 56 also produces a corresponding pressure in their branch lines 68, header conduit 66 and the pump displacement control conduit 64 back to the variable displacement or wobble plate control structure of the pump device 46. Thus, as the demand for fluid pressure increases in the hydraulic driving arrangements 42, simultaneous and corresponding pump wobble plate control pressures are communicated to the pump device 46 to automatically adjust its output in direct relation to the increased energy demand called for. It will also be understood that the vehicle is driven in the reverse direction by the operator rocking the control column 72 rearward thereby moving both of the valve operators 76, 78 simultaneously forwardly which reverses the direction of fluid flow in the reversible motor supply and return lines 54, 56. It is to be noted that when traveling in a straight line forward or backward, with the steering wheel in neutral or non-turning position, the vehicle will automatically tend to travel in the straight line since the automatic flow adjuster valve 62 normally provides equal fluid flow to each of the driving arrangements 42. Consequently, if one track meets an obstruction which might tend to slow its movement and tend to cause a turning of the vehicle the valve 62 will respond to the resulting change in pressure demand between the two driving units 42 to automatically restrict the flow of fluid to the unit 42 driving the unobstructed track 12 while maintaining maximum fluid flow to the unit 42 driving the unobstructed track to maintain the vehicle on a straight course. The pump 46 for the propulsion units 42 will also automatically respond to the increased motor demand of the unobstructed track by means of the increased pressure in the pump displacement control conduit 64 to provide an increased output in conformity with the increased demand of the driving unit 42 of the obstructed track.

In steering the vehicle 10, the operator need only turn the steering wheel 86 which urges one of the valve operators 76 in one direction and the other valve operator 78 in the opposite direction. If the vehicle is traveling forward, it may be turned by returning one of the valve operators toward neutral thus reducing of the supply of pressure fluid to one hydraulic driving arrangement 42 while the other hydraulic driving arrangement continues to be driven and drives the vehicle in a rotary direction.

The vehicle may be similarly turned, in either direction while being driven in reverse. Moreover, if it is desired to spin the vehicle around in substantially its own length, the steering wheel 86 is turned so that one of the valve operators is positioned in its extreme forward position while the other is in its extreme rearward position thereby driving one drive sprocket wheel 20 forwardly and the other drive sprocket wheel in a reverse direction.

During turns, as well as during forward and reverse travel of the vehicle 10, the novel automatic flow regulator or pressure fluid metering means 62 balances the tractive effort of each of the hydraulic driving arrangements 42 by proportioning the flow of hydraulic pressure fluid between them. When the vehicle is in operation and moving either forwardly, in reverse, or turning, the total demand of the hydraulic driving arrangements is communicated to the pump device 46 through the pump control conduit 64. However, the individual demands of the hydraulic driving arrangements 42 may be different especially while turning or if the ground is slippery or loose beneath one track 12. Accordingly, since the pressure to each hydraulic driving arrangement is also exerted on the piston 98 of the pressure fluid metering means 62, reciprocally positioned between the fluid flow chambers 108, 110, a decrease in traction under one track will cause a drop in pressure in the corresponding chamber. Thus, if the left track 12 begins to slip or spin, the pressure decrease in the chamber 110 allows the piston 98 to move to the left in FIGURE 7 and the valve member 102 accordingly reduces the flow of fluid to the left hydraulic driving arrangement. Consequently, less power is delivered to the left track than to the right track allowing each to pull with maximum tractive effort according to the condition of the ground beneath each track.

Provision is also made for utilizing the novel hydraulic system, apparatus, arrangement and method of the present invention for powering any other hydraulic unit, attachment, device or the like which may be employed with or mounted on the vehicle 10. To illustrate this additional feature of the invention, attention is directed to the bulldozer attachment 30, as seen in FIGURES 1 and 2, having a hydraulically operable elevating ram 36 and a hydraulically operable tilt ram 40. Since each of these rams 36, 40 is merely another form of reversible, fixed displacement hydraulic actuator generally similar in operation to the hydraulic driving arrangements 42, it follows that the system for operating these hydraulic rams will also be very similar to that powering the driving arrangements. The only exception to this, in the illustrative arrangement, is that the control valving is separate rather than coupled to a valve 62, there being no necessity to provide additional pressure fluid metering means to balance the flow between the two rams 36, 40.

To power the bulldozing attachment 30, a supply conduit 122 communicates pressure fluid from the main supply conduit 58 through branch lines 124 and 126 to two four-way control valves 128 and 130. Each of the valves 128, 130 also has a return flow conduit 132 coupled to the main reservoir return conduit 61. In addition, flow reversible pressure fluid supply and return lines 134 and 136 place the elevating ram in communication with valve 128 and similar lines 138 and 140 communicate valve 130 with the tilt ram 40. A common pressure transmitting control conduit 142 having branch lines 144 with individual check valving 146 associated with each of the lines 134, 136, 138, 140 transmits motor demand pressure as a hydraulic control pressure to the displacement control of the pump device 46.

The operation of the bulldozing attachment is not set forth in detail since it is generally similar to the operation of the vehicle driving and steering arrangements 42 as explained above. It is believed sufficient to say that the operator, by the moving operators (not shown) for valves 128, 130, controls the direction and extent (within limits) of movement of the respective ram 36, 40. Inasmuch as the pressure transmitting control conduit 142 of the rams is also coupled to the displacement control conduit 64 of the variable discharge pump 46, the pressure demand of the rams 36, 40 is cumulative in nature with the pressure demand of the hydraulic driving arrangements 42 and the pump device 46 will accordingly be adjusted to discharge hydraulic fluid at a pressure to satisfy the total demand thereon.

In FIGURE 8 there is illustrated a modified hydraulic system, apparatus and method for driving and steering vehicles which employs certain principles of the present invention. It will be noted that this embodiment embraces a power source 150 driving two separate variable displacement pump devices 146, 146', each having its own reservoir 148, 148', supply 149, 149' and return means 161, 161', valving 160, 160' and flow reversible supply conduits 154, 154' and return conduits 156, 156', with pressure transmitting control conduits 164, 164' coupled to the displacement control mechanism of the hydraulic driving arrangements 142, 142'. In this instance the control valving 160, 160' is individually operated as in the bulldozing control system, rather than being coupled as in the preferred form of the vehicle driving and steering system above described. Thus, the vehicle can be steered by the manipulation of the individual valve operators associated with each hydraulic pump and driving arrangement. In addition, a steering wheel 186' is coupled to the variable orifice valves 180, 182 located in each of the pressure supply lines 158, 158'. Accordingly, while the vehicle is traveling generally forward or in reverse, the operator, by manipulation of the steering wheel 186', can proportion the supply of pressure fluid to each of the hydraulic driving arrangements 142, 142'. With the steering wheel 186' in position for either straight forward or rearward movement of the vehicle each of the pumps 146 and 146' supply fluid to each of the track motors 142 and 142', respectively, under equal pressure to provide the straight forward vehicle movement. However should one of the tracks 12 meet an obstruction which tends to slow its movement and thus tend to cause a turning of the vehicle the pump 146 or 146', driving the displacement mechanism of the motor of the obstructed track, will automatically respond to the increased motor demand by the correspondingly increased fluid pressure which then occurs in the fluid pressure-responsive pump displacement control condit 164 or 164' to provide pressure fluid at a proportionately greater pressure to the motor 142 or 142' driving the obstructed track 12 in an effort to maintain straight line vehicle movement. When, however, the obstruction is overcome the augmented fluid pressure will automatically return to its pre-obstruction value since the pressure in the pump displacement control conduit 164 or 164' will in like manner return to a normal value.

From the above discussion, it will now be appreciated that I have disclosed in various forms a novel system, apparatus, arrangement and method for driving and steering vehicles as well as powering auxiliary equipment thereon. Moreover, this system, apparatus, arrangement and method is inexpensive to manufacture and install; convenient and trouble-free in use and application; simple, reliable, durable and effective; and is more flexible and useable than any other system, apparatus, arrangement and method heretofore known.

While the invention has been described, disclosed, illustrated and shown in terms of certain preferred embodiments or modifications which it has assumed in practice, the scope of the invention should not be deemed to be limited by the precise certain embodiments or modifications herein shown, described, illustrated and disclosed, such other embodiments or modifications are intended to be reserved as they fall within the scope of the claims here appended.

I claim as my invention:

1. A hydraulic system for driving a vehicle having at least a pair of drive wheels one each of which is disposed to opposed sides of the vehicle, said system comprising, in combination,
hydraulic driving means coupled to each of said vehicle drive wheels,
normal minimum flow variable displacement pump means having a source of fluid in communication therewith,
said variable displacement hydraulic pump means having control means for varying the displacement thereof,
pressurized fluid supply conduit means for placing the pressurized fluid discharge of the pump means in communication with the hydraulic driving means,
valving for selectively controlling the pressurized fluid discharge of the pump means through the pressurized fluid supply conduit means to the hydraulic driving means, and
control conduit means for transmitting the total developed fluid pressure of the discharged fluid in the pressurized fluid supply conduit means directly back to said pump displacement control means by placing the pressurized fluid supply conduit means of said pair of hydraulic driving means in direct communication with the pump displacement control means to enable such developed fluid pressure to act on the control means of the pump means,
said control conduit means extending directly between said pump displacement control means and the pressurized fluid supply conduit means to said hydraulic driving means at locations therealong which are downstream of the valving to enable the fluid pressure which has been transmitted to the pump displacement control means through the control conduit means to be effective in varying the pressurized fluid discharge of the pump means in direct response to the demand which has been placed thereon by the hydraulic driving means which is coupled to the respective drive wheels of the vehicle.

2. A hydraulic system for driving a vehicle as defined in claim 1 wherein:
said pressurized fluid supply conduit means for placing the pressurized fluid discharge of the pump means in communication with the hydraulic driving means is provided with an automatic pressure responsive fluid flow regulator valve device mounted therein,
said fluid flow regulator valve device being located in said pressurized fluid supply conduit means at a location therealong which is intermediate said pump means and said valving,
said fluid flow regulator valve device being effective to vary the supply of pressurized fluid between the hydraulic driving means coupled to each of the vehicle driving wheels proportionally and in direct response to differential load demands placed on the hydraulic driving means.

3. A hydraulic system for driving a vehicle as defined in claim 1 wherein:
said hydraulic driving means is provided with inlet and outlet sides for said pressurized fluid discharge of the pump means, and
said pressurized fluid supply conduit means for placing the pressurized fluid discharge of the pump means in communication with the hydraulic driving means comprises pairs of conduits extending between said valving and the respective inlet and outlet sides of said hydraulic driving means,
said valving selectively controlling the direction and amount of flow of pressurized fluid discharge of the pump means through either of said pairs of conduits to effect bi-directional actuation of said hydraulic driving means.

4. A hydraulic system for driving a vehicle as defined in claim 3 wherein:
said pressurized fluid supply conduit means for placing the pressurized fluid discharge of the pump means in communication with the hydraulic driving means has an automatic pressure responsive fluid flow regulator valve device mounted therein,
said fluid flow regulator valve device being located in said pressurized fluid supply conduit means at a location therealong which is intermediate said pump means and said valving,
said fluid flow regulator valve device varying the supply of pressurized fluid between the hydraulic driving means coupled to each of the vehicle driving wheels proportionally and in direct response to differential load demands occurring therebetween.

5. A hydraulic system for driving a vehicle as defined in claim 3 comprising:
manually operable tiltable and rotatable actuating means for positioning said valving to regulate the direction and amount of pressurized fluid discharge to the bi-directional hydraulic driving means so as to drive and steer the vehicle.

6. A hydraulic system for driving a vehicle having a drive wheel on each side thereof, said system comprising, in combination,
an engine mounted on the vehicle,
hydraulic motor means individually coupled for driving each of said drive wheels,
hydraulic pump structure for discharging hydraulic fluid under pressure,
said pump structure being driven by said engine and having control means for varying the displacement thereof,
a source of hydraulic fluid in communication with said pump structure,
pressure fluid supply conduit means interconnecting the fluid discharge of said pump structure with each of the hydraulic motor means driving each of the vehicle wheels,
an automatic pressure responsive fluid flow regulator valve device mounted in said pressure fluid supply conduit means and operative to vary the supply of pressure fluid between the hydraulic motor means driving each of the vehicle wheels proportionately and in direct response to differential load demands occurring between each of the hydraulic motor means,
valving mounted in said pressure fluid supply conduit means intermediate said fluid flow regulator valve device and each of said hydraulic motor means for individually and selectively controlling the flow of hydraulic pressure fluid to each of said hydraulic motor means,
and control conduit means for transmitting the total developed fluid pressure of the discharged fluid in the respective pressurized fluid supply conduit means directly back to the pump control means by placing the respective pressurized fluid supply conduit means in direct communication with the pump control means to enable such developed fluid pressure to act on the pump control means,
said control conduit means extending directly between the pump control means and the respective pressurized fluid supply conduit means at a location therealong which is downstream of the respective valving to enable the developed fluid pressure which has been transmitted to the pump control means through the respective control conduit means to be effective in varying the pressurized fluid discharge of the pump structure in direct response to the demand which has been placed thereon by the respective hydraulic motor means that is coupled to the respective drive wheel of the vehicle.

7. A hydraulic system for driving a vehicle as defined in claim 6 wherein:
said pressure fluid supply conduit means comprises pairs of conduits extending between said valving and the respective inlet and outlet sides of each of said hydraulic motor means for driving the vehicle wheels at opposite sides of the vehicle.

said valving comprising a pair of fluid flow-reversing variable orifice flow controlling members, each of said valving members being positioned in said pressure fluid supply conduits intermediate of and connecting said fluid flow regulator valve device and each of said pairs of conduits to each of said hydraulic motor driving means for selectively controlling the direction and amount of flow of pressure fluid through either of said pairs of conduits to effect bi-directional actuation of either of said hydraulic motor means.

8. A hydraulic system for driving a vehicle as defined in claim 7 comprising:

manually operable means for actuating each of said valving members, said manually operable means comprising a tiltable and bi-directionally rotatable member connected to each of said valving members, said rotatable member when tilted in either of two opposite directions simultaneously operates each of said valving members for effecting fluid flow of pressure fluid from said hydraulic pump structure to and from said hydraulic motor means in either of two directions and when rotated in either of two opposite directions operates said valving members for varying the volume of flow through either of said hydraulic motor means.

9. A hydraulic system for driving a vehicle having a drive wheel on each side thereof adapted to drive a movable endless track means, a source of power on the vehicle, a hydraulic pump connected to a source of hydraulic fluid and driven by said source of power for discharging hydraulic fluid under pressure, said hydraulic pump having a control device for varying the displacement thereof, hydraulic driving means coupled to and driving each of said drive wheels, pressure fluid conduit means interconnecting the pressure fluid discharge end of said hydraulic pump with the hydraulic driving means for driving each of said vehicle drive wheels, valving mounted in said pressure fluid conduit means, said valving comprising a pair of valve members, each of said valve members having a fluid flow reversing and adjustable flow throttling means, a pair of supply conduits connected between the downstream side of each one of said valve members and said hydraulic driving means, each of said valve members being operative to provide reversal and volumetric control of fluid flow through the pair of supply conduits and the hydraulic driving means connected thereto, manually operable means for actuating both of said valve members either simultaneously or selectively, said manually operable means comprising elongate shaft means mounted intermediate the length thereof for tilting movement in either of two opposed directions in a given plane and for rotation in either of two directions about the longitudinal axis thereof, means connecting one end portion of said shaft means to each of said valve members, said means being constructed and arranged to provide for either simultaneous or selective actuation of said valve members for reversal and volume control of fluid flow therethrough when said shaft means is correspondingly tilted and rotated, and control conduit means for transmitting the total developed fluid pressure of the discharge fluid in each of the supply conduits directly back to the pump control device by placing each of the supply conduits in direct communication with the pump control device to enable such developed fluid pressure to act on the pump control device, said control conduit means extending directly between the pump control device and the respective supply conduits to enable the fluid pressure which has been transmitted to the pump control device through the respective control conduit means to be effective in varying the pressurized fluid discharge of the pump in direct response to the demand which has been placed thereon by the respective hydraulic driving means which is coupled to the respective drive wheel of the vehicle.

References Cited by the Examiner

UNITED STATES PATENTS

| | | | |
|---|---|---|---|
| 2,393,324 | 1/1946 | Joy | 180—6.48 |
| 2,472,477 | 6/1949 | Harrington et al. | 60—52 |
| 2,771,958 | 11/1956 | Ball | 180—6.48 |
| 2,789,648 | 4/1957 | Huffman | 180—66 |
| 2,892,312 | 6/1959 | Allen et al. | 60—52 |
| 2,921,439 | 1/1960 | Krafft et al. | 60—52 |
| 3,003,262 | 10/1961 | De Biasi | 298—7 X |
| 3,003,309 | 10/1961 | Bowers et al. | |
| 3,025,673 | 3/1962 | Brown et al. | 180—6.48 |

BENJAMIN HERSH, *Primary Examiner.*

A. HARRY LEVY, *Examiner.*